April 11, 1939.    A. J. HIXON    2,154,163
CABLE TAPPING DEVICE
Filed April 22, 1937

Inventor:
Alfred J. Hixon,
by Emery, Booth, Townsend, Miller & Weidner
Attys.

UNITED STATES PATENT OFFICE 2,154,163

CABLE TAPPING DEVICE

Alfred J. Hixon, Braintree, Mass.

Application April 22, 1937, Serial No. 138,395

1 Claim. (Cl. 173—273)

My invention relates to cable tapping devices, and has among its objects the provision of a device of this kind adapted with facility to secure electric cables of widely varying diameters.

The invention will be best understood from the following description when read in the light of the accompanying drawing of an embodiment of the invention, the scope of which latter will be more particularly pointed out in the appended claim.

In the drawing:—

Figure 1 is a plan of a device constructed according to the invention;

Figs. 2 and 3 are respectively sections on the lines 2—2 and 3—3 of Fig. 1;

Figure 1:
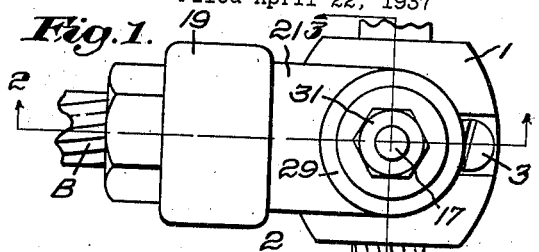
Figure 2:
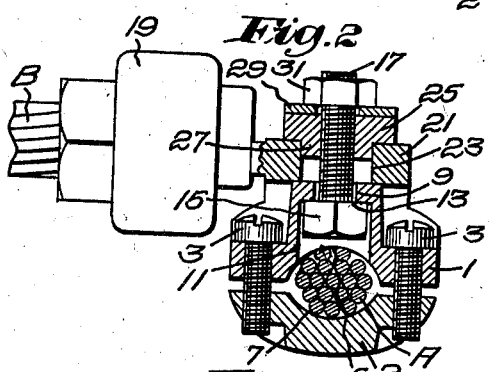
Figure 3:
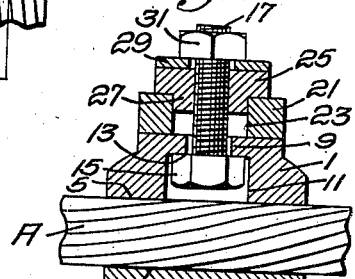
Figure 4:
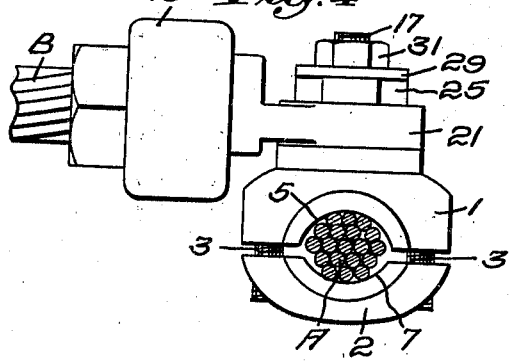
Fig. 4 is a side elevation according to Fig. 1.
Figure 5:
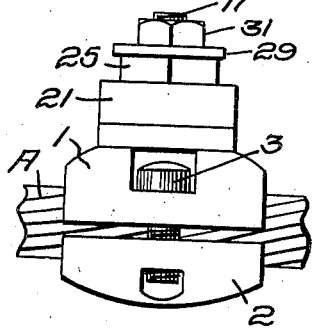
Fig. 5 is an end elevation according to Fig. 1.
Figure 6:
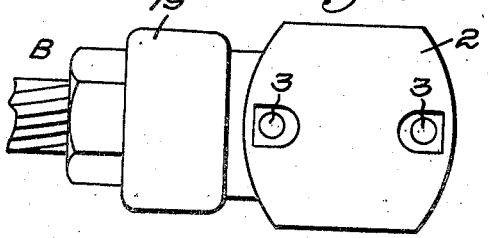
Fig. 6 is a bottom plan view according to Fig. 1.

Referring to the drawing, connected to the stranded electric cable or other conductor A is a fitting comprising an upper member 1 and a lower member 2 which are joined by a pair of screws 3 for drawing them toward each other. The two members have complementary transverse recesses 5 and 7 respectively formed on their adjacent surfaces so that when the members are in assembled relation an opening is provided through which the cable A extends. The fitting may be securely clamped to the cable by drawing the two members together by means of the screws 3.

Figure 7:
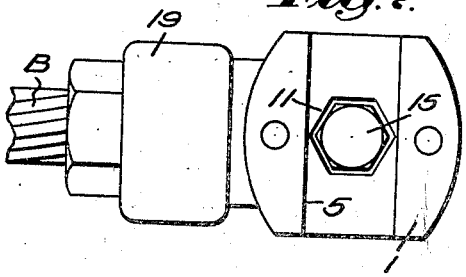
Fig. 7 is a bottom plan view corresponding to Fig. 6 with the lower cable clamping member removed.

As illustrated, the upper member 1 is formed with an opening 9 which communicates with the recess 5 therein, this opening having an enlargement 11 adjacent the recess 5 providing a shoulder 13, the enlargement being of polygonal transverse cross-section as, for example, being of hexagon shape as illustrated in Fig. 7.

In the device illustrated, the enlargement 11 receives the hexagon head 15 of a bolt, which head in the assembled device is adapted to bear against the shoulder 13. The shank 17 of the bolt projects through the perforation 9 to the exterior of the member 1. This bolt may be used to connect any desired sort of a fitting to the member 1 as, for example, the mechanical cable lug 19 for the cable or tap conductor B. As shown, the mechanical lug has a flattened projection 21 which rests upon the upper surface of the member 1, the projection being provided with a perforation 23 through which the shank 17 of the bolt projects. On the shank of the bolt is screwthreaded a nut 25 which, as shown, has a cylindrical projection 27 rotatably entering the perforation 23, this nut acting to clamp the projection 21 against the adjacent surface of the member 1. On the shank 17 above the nut 25 are shown a washer 29 and a lock nut 31.

With the construction shown, bolts having shanks 17 of different lengths to suit various conditions may be readily substituted for each other. The hexagonal enlargement which receives the head of the bolt prevents rotation thereof relative to the member 1, enabling the nut 25, or other nuts which may be on the shank, to be readily tightened. It will be noted that the head of the bolt is prevented by the cable A from dropping out of the hexagonal enlargement prior to placing the nuts on the shank of the bolt in assembling the tap connector fitting, or other parts secured by the bolt, with the member 1. Nuts 25 having cylindrical projections 27 of different diameters may be employed to take care of tap connector fittings or the like having perforations 23 of different diameters, it being understood that this cylindrical projection prevents the possibility of the cable lug shifting materially relative to the member 1. When the perforation 23 is about the diameter of the shank 17 of the bolt the position of the nuts 25 and 31 may be reversed, in which case the washer 29 will rest upon the upper surface of the projection 21 of the fitting, and the nut 31 will bear against the washer and the nut 25 will bear against the nut 31.

It will be understood that within the scope of the appended claim wide deviations may be made from the form of the invention shown without departing from the spirit of the invention.

I claim:

A cable tap having, in combination, a terminal lug carrying member adapted to contact with a side of the cable, a part adapted to contact with the opposite side of the cable, means for detachably connecting said member and part and moving them toward each other for clamping the cable between them, said member having a through opening the axis of which intersects that of the cable, which opening has a portion of polygonal cross-section adjacent the cable contacting side of said member and is formed to provide a shoulder facing said side, a removable bolt having a head of polygonal cross-section adapted to bear against said shoulder and be restrained against rotation by cooperation with the walls of the polygonal portion of said opening and be retained in said opening by the cable when said member contacts with the latter, said bolt having a screw-threaded shank slidably extending through and substantially fitting the portion of said opening between said shoulder and the side of said member opposite the cable contacting side thereof, and a nut screw-threaded on the projecting portion of said shank having a cylindrical extension surrounding said shank and projecting toward the adjacent side of said member adapted rotatably to fit the cylindrical opening of a terminal lug clamped by said nut to the adjacent side of said member, whereby, by substituting nuts with extensions of different diameters, terminal lugs with different size openings may be secured to said member.

ALFRED J. HIXON.